Oct. 27, 1942.   J. J. BOULTON   2,299,791
LOADER AND TRACTOR STRUCTURE
Filed Aug. 17, 1940   4 Sheets-Sheet 1

Oct. 27, 1942.  J. J. BOULTON  2,299,791
LOADER AND TRACTOR STRUCTURE
Filed Aug. 17, 1940  4 Sheets-Sheet 4

Inventor
JAMES J. BOULTON

Patented Oct. 27, 1942

2,299,791

UNITED STATES PATENT OFFICE 2,299,791

LOADER AND TRACTOR STRUCTURE

James J. Boulton, Alta Vista Township, Lincoln County, Minn.

Application August 17, 1940, Serial No. 353,085

6 Claims. (Cl. 198—11)

This invention relates to a combination of a tractor and a loading mechanism for loading hay, sheaves or bundles of grain and similar material disposed at and supported from said tractor at one side thereof, said loading mechanism comprising an endless carrier which is driven from said tractor.

It is often desirable to load hay or grain onto a vehicle and to have the loader move along after the cutting mechanism. It is thus desirable to have the loading mechanism when driven by a tractor at one side of the tractor so that the loading mechanism can move along next to the standing crop without either the loading mechanism or the tractor running over the same. It is also desirable to have the loading mechanism disposed at one side of the tractor for the convenience of operation and so that the vehicle to be loaded may be conveniently disposed and drawn. It is also objectionable to have the loader longitudinally alined with and extending directly over the tractor.

It is an object of this invention, therefore, to provide simple and efficient means by means of which the loading mechanism may be disposed at one side of, supported from and driven from said tractor.

It is a further object of the invention to provide simple and efficient means which may be connected to the tractor frame adjacent the front and rear thereof and which carries supporting members for the loading mechanism, said loading mechanism being disposed at one side of the tractor so that it can be driven from the regular pulley shaft of said tractor.

It is more specifically an object of the invention to provide means for supporting a loading mechanism at one side of a tractor comprising a horizontally extending member suitably secured to the front portion of the tractor frame and extending to one side thereof, a vertical standard secured to one end of said member, a second vertical standard secured to the tractor frame at the rear portion thereof, said loading mechanism having one of its side members connected to and supported by said vertical members, members preferably being provided extending from adjacent the top of said vertical member to the opposite side of said first mentioned member and tractor frame respectively, together with means for operating said loading mechanism from said tractor.

These and other objects and advantages of the invention will be fully set forth in the following description made in connection with the accompanying drawings in which like reference characters refer to similar parts throughout the several views and in which—

Figure 1:
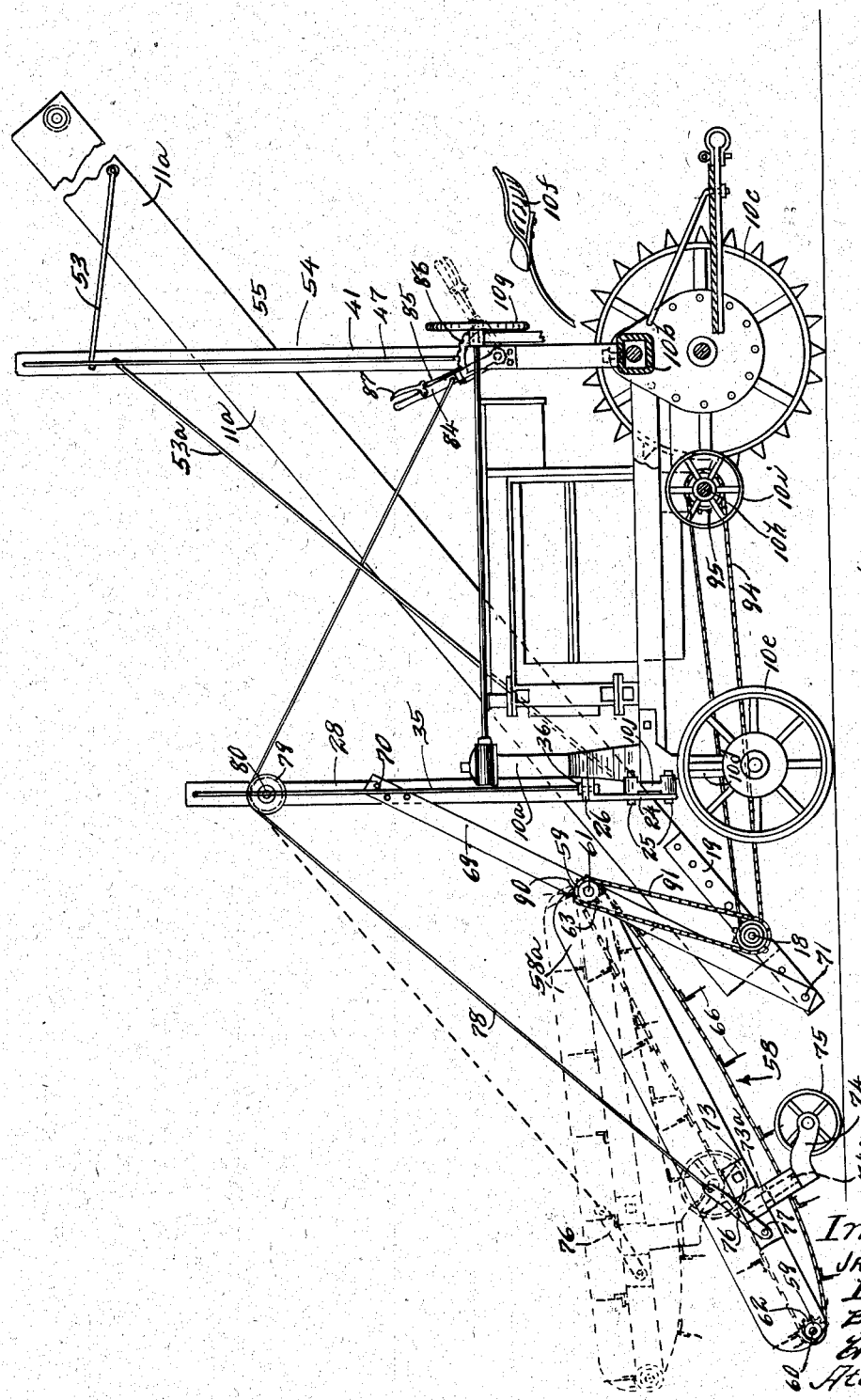
Fig. 1 is a view in side elevation of the tractor and loading mechanism supported thereby, some parts of the loading mechanism being shown in different positions in dotted lines.
Figure 2:
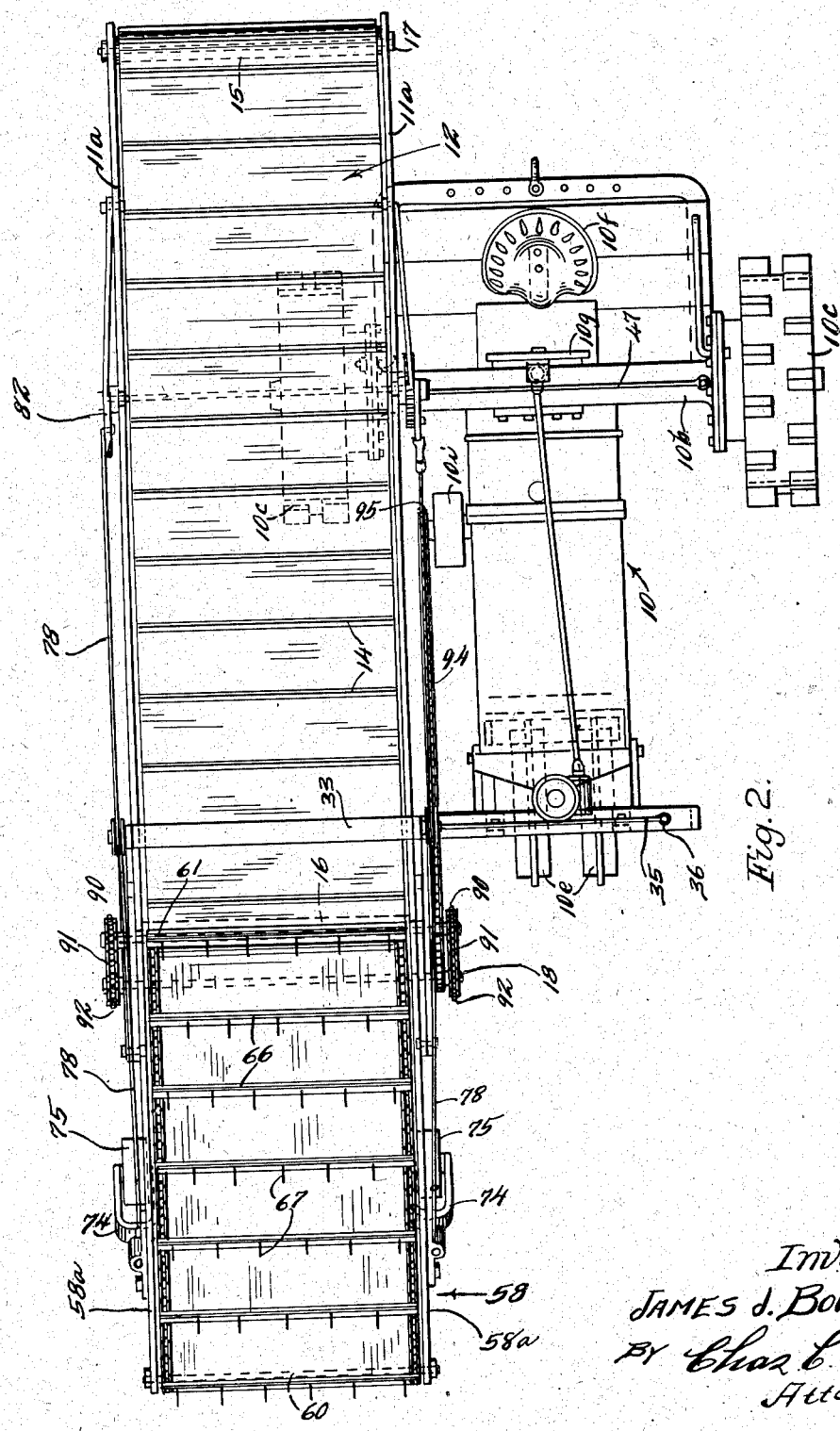
Fig. 2 is a top plan view of the tractor and loading mechanism supported thereby.
Figure 3:
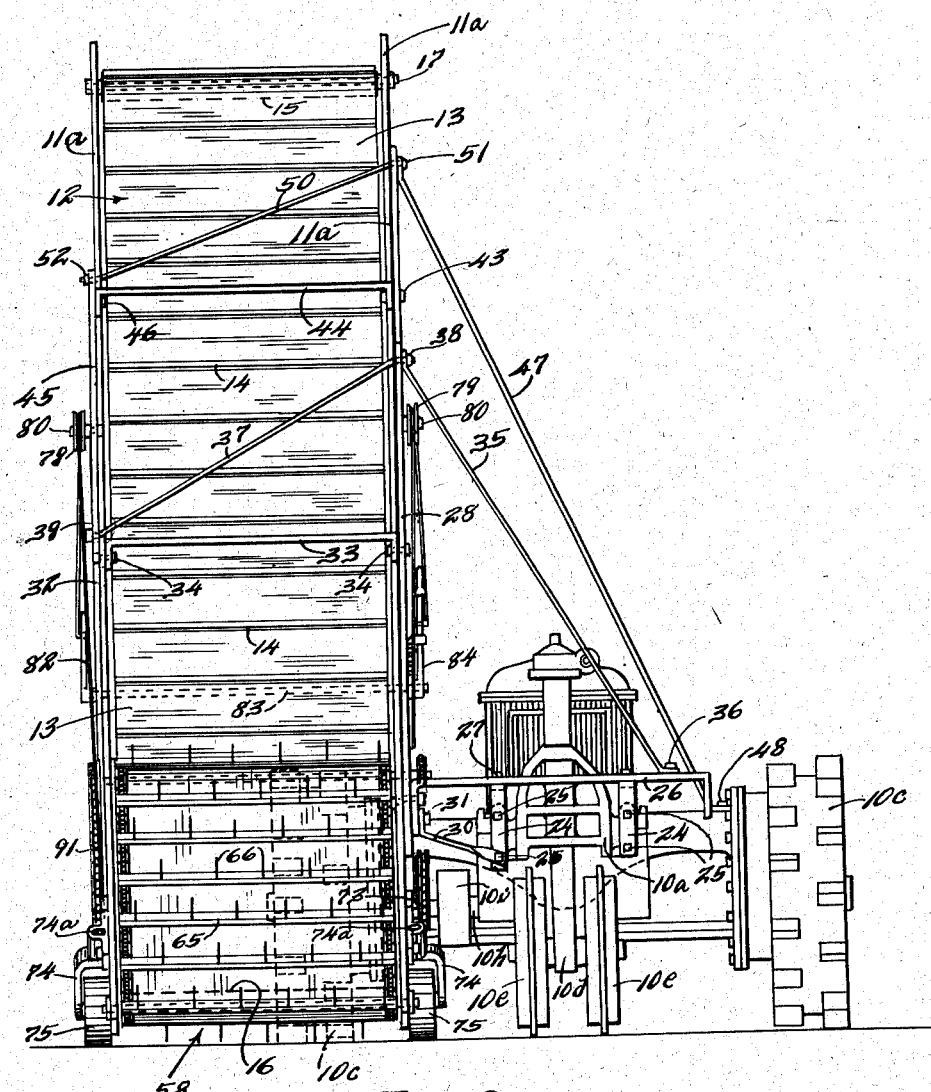
Fig. 3 is a view in front elevation of the parts shown in Fig. 2.
Figure 4:
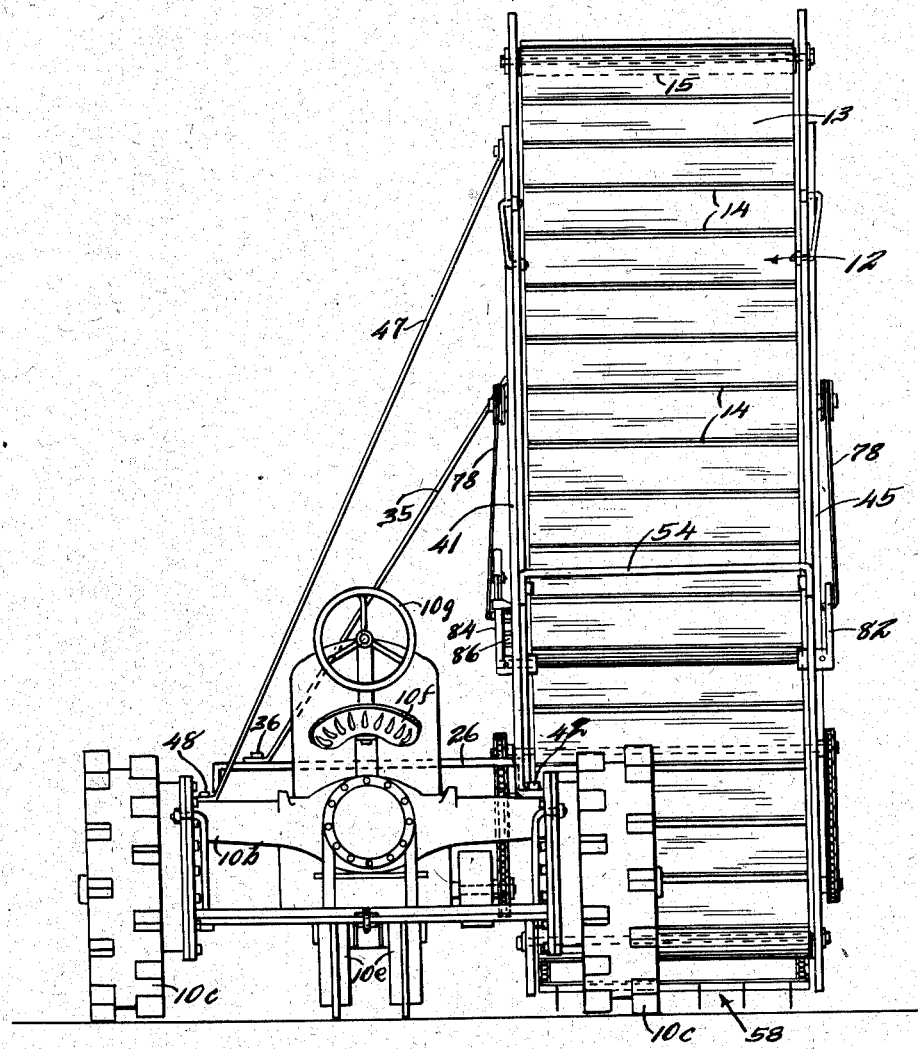
Fig. 4 is a view in rear elevation of the parts shown in Fig. 2.

Referring to the drawings, a tractor is illustrated and while various forms of commercial tractors could be used, in the embodiment of the invention illustrated a tractor is shown comprising a frame 10 having a front transversely extending portion 10a and a rear transversely extending portion 10b. Portion 10b as illustrated forms the differential support or housing of the tractor and has portions connected to its ends for supporting the rear wheels 10c and enclosing the driving mechanism therefor. Portion 10a supports a wheel-carrying member 10d carrying a front axle on which are disposed the front wheels 10e, member 10d being rotatable about a vertical axis. The tractor is provided with the usual operator's seat 10f and steering wheel 10g and has a pulley shaft 10h at one side carrying a pulley 10i which is sometimes used for driving other machines or mechanisms. Frame portion 10a has at either side thereof lugs 10j having vertically spaced horizontally extending holes therethrough.

The loading mechanism might take different forms, but in the embodiment of the invention illustrated the same is shown as comprising upwardly and rearwardly extending side frame members 11a between which is supported and moves an endless carrier 12. Endless carrier 12 comprises a flexible member or apron 13 having suitable spaced cleats or bars 14 secured thereto. Member 13 runs over rollers 15 and 16 disposed respectively adjacent the top rear end and the lower front end of said loading mechanism. Roller 15 is supported upon a revoluble shaft 17 journaled in bearings carried in the side frame members 11a and roller 16 is carried on a revoluble shaft 18 supported in suitable bearings carried in bars 19 respectively which are secured to the outer sides of the side frame members 11a.

In accordance with the present invention vertically extending bars 24 are secured to the spaced lugs 10j by headed and nutted bolts 25 extending through the vertically spaced apertures in said lugs. Bars 24 extend vertically in front of said lugs and have their upper ends bent rearwardly so that their top surfaces lie in a horizontal plane. A horizontally extending bar 26 is supported upon and secured to the tops of the bars 24 by headed and nutted bolts 27. Bar 26 extends to either side of the bars 24 and has its end portions 26a bent downwardly at a right angle. A vertical standard 28 is secured to the end of bar 26 at the pulley side of the tractor. Another bar 30 is secured to the downturned end of bar 26 by one of the headed and nutted bolts 31 which secure standard 28 to bar 26 and extends downwardly diagonally to and is secured by the lower bolt 25 securing the adjacent bar 24. Standard 28 is secured to one side frame member 11a of the loading mechanism and acts as a support therefor. A second vertical member 32 is secured to the other side frame member 11a transversely alined with standard 28 and said vertical members are connected by a rigid bar 33 extending therebetween having its ends downturned and connected thereto by the headed and nutted bolts 34. A rod 35 is secured to vertical standard 28 adjacent its upper end and extends downwardly diagonally and has its lower end secured by headed and nutted bolt 36 adjacent the end of bar 26 opposite that to which standard 28 is secured. A bar or rod 37 has one end extending through standard 28 and the upper end of bar 35, said end being threaded and equipped with a nut 38. Rod 37 extends downwardly to and through standard 32 and has its end equipped with a nut 39 disposed at the outer side of standard 32. A vertical standard 41 is secured to one side of rear frame member 10b, the same having its lower end bent at a right angle and secured to said member 10b by the bolt 42. Standard 41 extends vertically along the side 11a of the loading mechanism and is secured thereto by headed and nutted bolt 43. A bar 44 extends between standard 41 and a similar standard 45 disposed at the opposite side of the loading mechanism and secured to the opposite side frame member at the outer side thereof and transversely alined with standard 41. Bar 44 is secured at one end by bolt 43 and is secured at its other end to standard 45 by a bolt 46. A rod 47 is secured to standard 41 adjacent its upper end and extends downwardly to the frame member 10b and is secured thereto by a bolt 48 at the side thereof opposite that to which standard 41 is secured. A rod 50 has one end extending through standard 41 and rod 47 and threaded to receive a bolt 51, this rod thus securing the upper end of rod 47 in place and the same extends downwardly to and through the upper end of standard 45 and is equipped with a nut 52 at the outer side of standard 45. It will thus be seen that the loading mechanism has vertical standards secured to its side frame members adjacent the front and rear portions thereof and the vertical standards adjacent the tractor are firmly secured to and supported by the tractor frame and further braced and supported by rods 35 and 47. These parts together with bars 33 and 44 and rods 37 and 50 form a strong and rigid support for the loading mechanism. Preferably a bar 54 extends beneath the loading mechanism and beneath the side frame members 11a thereof, the same having its ends bent downward and secured to the standards 41 and 45. Bar 54 is suitably bolted to a bar or timber 55 secured to side member 11a. Rods 53 are secured at one end to standards 41 and 45 and at their other ends to the outer sides of side members 11a respectively at points rearwardly of said standards. Rods 53a are secured at one end to standards 41 and 45 a short distance below rods 53 and extend downwardly to and are secured to the lower portion of standards 28 and 32.

The loading mechanism illustrated comprises a pick-up swinging front section designated generally as 58, the same comprising longitudinally extending side frame members 58a suitably connected to and carrying bearings 59 in which are disposed shafts 60 and 61 disposed respectively at the lower and upper ends of members 58. Said shafts carry sprockets 62 and 63 adjacent the side members 58 over which run chains 64 and 65. Cross pieces 66 extend between and are secured to chains 64 and 65 and these cross pieces which are in the shape of angle bars have secured thereto transversely spaced teeth 67. The shaft 61 extends through bars 69, which bars are secured at their upper ends by bolts 70 to the outer sides of standards 28 and 32 and are secured at their lower ends by bolts 71 to the lower ends of bars 19. Shaft 61 can oscillate in the bars 69 so that the pick-up member 58 can be lifted and oscillated about shaft 61. Each side member 58a has secured thereto at its outer side a bracket 73 bored to receive a trunnion 74a of a yoke 74 in which is journaled the axle of a caster wheel 75. The trunnion 74a will be held in bracket 73 by some suitable means (not shown). A bar 73a extends beneath and between side members 58a and between brackets 73, being secured to the latter. A link 76 is pivotally connected by a stud 77 to bracket 73 and is apertured at its other end to receive the end of a flexible cable 78. There is a link 76 and cable 78 at each side of the pick-up member 58 and these cables run over sheaves 79 journaled on suitable studs 80 secured respectively in the standards 28 and 32. One cable 78 at its other end is connected to an arm 82 secured to a shaft 83 journaled in the standards 41 and 45. The other cable, namely the one nearest the tractor, is connected to a hand lever 84 secured to shaft 83. Hand lever 84 has connected thereto a pawl 85, the lower end of which is adapted to engage in one of a plurality of notches formed in a ratchet segment 86 secured to standard 41. A spring handle grip 87 is pivoted to hand lever 84 adapted to be gripped and moved to ratchet pawl 85 from its notch so that lever 84 may be oscillated. It will be seen that when lever 84 and arm 82 are oscillated with shaft 83 that cable 78 will be moved and that the pick-up member 58 may be raised or lowered. Shaft 61 has secured thereto at each end a sprocket 90 over which runs a chain 91 also running over a sprocket 92 secured to each end of the shaft 18. Shaft 18 also carries a sprocket or pulley 93 over which runs a belt or chain 94 also running over and driven by a sprocket or pulley 95 secured to the pulley shaft 21 of the tractor.

With the described structure it will be seen that the loading mechanism is supported from the tractor by vertical standards 28 and 41. These standards are secured to the tractor frame as described and are firmly supported by their connections as well as by the brace members 35 and 47. The cross pieces 33 and 44 extending to the standards at the side of the loader opposite the tractor cooperate in making a rigid frame for supporting the loader. The pick-up member 58 when in operative position rolls on the caster wheels 75. In the loading operation the tractor will be moved forwardly and chain 94 will be driven by sprocket 95 and will rotate shaft 18. This will rotate roller 16 and the endless member 13 will be moved so that its top flight moves upwardly between the side frame members 11a. Shaft 61 will be rotated by chains 91 and chains 64 and 65 will be driven from shaft 61. The teeth 66 will be moved into contact with the hay or the bundles or sheaves of grain so that the same are picked up and carried by members 65 and 66 and delivered onto the endless carrier comprising members 13 and 14. They will be carried upwardly and delivered over the upper rear end of the endless carrier and will thus be delivered to the vehicle on which they are to be loaded. The loader is disposed as shown at one side of the tractor at the front portion of the latter and is disposed over one rear wheel of the tractor at the rear end thereof. The tractor is thus not covered by the loader and the vision of the driver of the tractor is not obscured by the front portion of the loader. The loader can be moved along adjacent standing grain or it can be moved along as desired in alinement with a windrow to pick up the material to be loaded. When the loader is being transported from one job to another or for any distance the lever 84 can be swung to lift the pick-up device to the position shown in dotted lines in Fig. 1.

From the above description it will be seen that I have provided a very simple and efficient structure by means of which the loader may be supported from and disposed at one side of the tractor to be operated thereby. The structure requires little or no change in the tractor. The sprocket for driving the loader can easily be attached to the driven pulley shaft of the tractor. The loader is very effectively supported and can be moved along by the tractor at a rapid rate. The device has been amply demonstrated in actual practice and found to be very successful and efficient.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. The combination with a tractor having front and rear pairs of wheels and a frame having a transversely extending portion at its front end, of a loading attachment comprising spaced vertically extending members secured to said frame at its front portion, a horizontally extending bar secured to said members and extending transversely of said frame and to one side thereof, a vertically extending standard secured to said horizontally extending member at one side thereof, a loading mechanism comprising upwardly extending spaced side frame members with an endless carrier disposed therebetween supported upon said standard, a second standard secured to said tractor frame at the rear thereof and substantially longitudinally aligned with said first mentioned standard also supporting said loading mechanism and means for driving said endless carrier from said tractor.

2. The combination with a tractor having front and rear pairs of wheels and a frame having a front end member extending transversely over said front wheels and a member extending transversely between said rear wheels of a loading attachment comprising spaced vertical members rigidly secured to said first mentioned member, a bar rigidly secured to and supported at the upper ends of said spaced vertical members and extending laterally beyond the sides of said tractor frame, said bar having a vertically extending portion at one end, a vertical standard secured to said last mentioned portion, a vertically extending member rigidly secured to said second mentioned member of said tractor frame and longitudinally aligned with said first mentioned standard, a loading mechanism comprising spaced side members and an upwardly extending endless carrier therebetween secured to and supported by said standards, an auxiliary supporting member extending from the top of said first mentioned standard to adjacent the opposite end of said bar and an auxiliary support secured to the top of said second mentioned standard and extending to the opposite end of said second mentioned member.

3. The combination with a tractor having a pair of front wheels, a pair of rear wheels and a frame supported thereby having a front end member disposed over said front wheels and an axle housing member extending between said rear wheels, a frame rigidly secured to the front end of said first mentioned member including a bar extending transversely of said tractor frame to one side thereof, a vertical standard secured to one end of said bar at one side of said tractor frame and extending vertically, a standard secured to said second mentioned member of said tractor frame and substantially longitudinally aligned with said first mentioned standard, a loading mechanism comprising spaced side members and an upwardly extending endless carrier therebetween rigidly secured to and carried by said standards, a sheave adjacent the top of said first mentioned standard, said loading mechanism having a swinging front section, a cable secured to said section and passing over said sheave, a lever adjacent the operator's position on said tractor frame to which said cable is connected for raising and lowering said section.

4. The combination with a tractor having a frame carrying a front axle with a pair of closely spaced front wheels thereon, a pair of widely spaced rear driving wheels, said frame having an axle housing extending between said rear wheels, said frame having a front end portion above said front wheels, of a loading mechanism comprising spaced upwardly and rearwardly extending side frame members, an endless carrier supported between said side frame members, a horizontally extending bar secured to said front end portion of said frame above said wheels and having an end disposed at one side of said tractor, a vertical standard having a free upper end secured to said end of said bar, said standard engaging the adjacent side frame member of said loading mechanism, means rigidly connecting said side frame member and standard together, a rear standard secured to said axle housing in substantial longitudinal alignment with said first mentioned standard, the same having a free upper end and engaging said adjacent side frame member, means rigidly connecting said standard and said adjacent side frame member, said loading mechanism being disposed over one of said rear wheels, and means for driving said carrier from said tractor.

5. The combination with a tractor having a pair of closely spaced front wheels, a pair of widely spaced rear wheels and a frame supported thereby having a front end portion extending transversely over said front wheels and an axle housing member extending between said rear wheels, of a loading attachment disposed at one side of said tractor and extending longitudinally thereof comprising spaced side members and an upwardly extending endless carrier therebetween, a vertical standard at the remote side of said attachment and rigidly secured to the remote side member, the same being disposed some distance from the front end of said carrier, said standard being substantially transversely aligned with said front end portion of said tractor frame, a vertical standard at the remote side of said attachment rigidly secured to the remote side member and substantially transversely aligned with said housing, a substantially horizontal bar secured to said front end portion and having an end disposed at one side of said tractor, a vertical standard secured to the end of said bar in line with said first mentioned standard and rigidly secured to the adjacent side frame member, means connecting said standard and first mentioned standard above said carrier, a vertically extending standard rigidly secured to said housing at the side thereof adjacent said attachment and transversely aligned with said second mentioned standard, means rigidly connecting said second mentioned and last mentioned standards and means for driving said endless carrier from said tractor.

6. The structure set forth in claim 5, an auxiliary supporting member secured to said last mentioned standard adjacent its top and extending downwardly in an inclined direction to the opposite end of said housing and secured thereto and an auxiliary supporting member secured to said standard secured to said bar adjacent its top and extending downwardly in an inclined direction and secured to the opposite end of said bar.

JAMES J. BOULTON.